US006795693B2

United States Patent
Balech

(10) Patent No.: US 6,795,693 B2
(45) Date of Patent: Sep. 21, 2004

(54) METHOD FOR CONTROLLING THE TRANSMITTER PART OF A RADIO TRANSCEIVER AND A CORRESPONDING RADIO TRANSCEIVER

(75) Inventor: Jean-Pierre Balech, Antony (FR)

(73) Assignee: Alcatel, Paris (FR)

( * ) Notice: Subject to any disclaimer, the term of this patent is extended or adjusted under 35 U.S.C. 154(b) by 539 days.

(21) Appl. No.: 09/836,342

(22) Filed: Apr. 18, 2001

(65) Prior Publication Data

US 2001/0049264 A1 Dec. 6, 2001

(30) Foreign Application Priority Data

May 9, 2000  (EP) ............................................. 00440132

(51) Int. Cl.$^7$ .............................................. H04B 17/00
(52) U.S. Cl. ................................ 455/115.1; 455/115.2; 455/126; 375/219; 375/221
(58) Field of Search .............................. 455/126, 115.2, 455/78, 103, 423, 115.1, 115, 67.11, 67.14; 375/296, 284, 297, 285, 219, 221, 222, 241, 242, 259, 279, 281, 377

(56) References Cited

U.S. PATENT DOCUMENTS

| | | | | |
|---|---|---|---|---|
| 5,351,016 A | * | 9/1994 | Dent ........................... | 332/103 |
| 5,604,728 A | * | 2/1997 | Jylha ........................... | 370/241 |
| 5,754,560 A | * | 5/1998 | Nousiainen et al. ......... | 714/716 |
| 5,894,496 A | * | 4/1999 | Jones ........................... | 455/126 |

FOREIGN PATENT DOCUMENTS

| | | |
|---|---|---|
| EP | 0 559 354 A2 | 9/1993 |
| EP | 0 690 593 A2 | 1/1996 |
| EP | 0 715 420 A2 | 6/1996 |
| EP | 0 905 940 A2 | 3/1999 |
| WO | WO 94/299976 | 12/1994 |

* cited by examiner

Primary Examiner—Charles Appiah
(74) Attorney, Agent, or Firm—Sughrue Mion, PLLC

(57) ABSTRACT

The invention relates notably to a method for controlling the transmitter part of a radio transceiver, the transmitter part comprising an IQ modulator, the radio receiver further comprising a receiver part comprising an IQ demodulator, the radio transceiver being dedicated to transmit modulated information signal over an air interface.

According to the invention, the method consists in:
- storing an IQ modulation vector obtained at IQ modulator and associated to a portion of the information signal;
- looping the portion of information signal to the receiver part, the information signal having crossed a simulated radio interface between the transmitter part and the receiver part;
- estimating an error vector by comparing the IQ modulation vector to an IQ demodulation vector obtained by demodulation of the portion of information signal at IQ demodulator; and
- modifying transmitter part parameters according to the error vector.

9 Claims, 3 Drawing Sheets

METHOD FOR CONTROLLING THE TRANSMITTER PART OF A RADIO TRANSCEIVER AND A CORRESPONDING RADIO TRANSCEIVER

BACKGROUND OF THE INVENTION

The present invention relates to the field of telecommunications and more particularly to a method for controlling the transmitter part of a radio transceiver in order to correct power drift or amplifiers non-linearity.

In the description below, the term "radio transceiver" refers to a radio terminal as well as to a base station of a radio communication network. The following invention is applicable as well in fixed as in mobile radio communication networks.

In a radio communication network, resources are allocated to a radio transceiver on a communication channel to transmit/receive information signals to/from the radio communication network. Resources are preferably allocated according to time-sharing principles. However, code-sharing, frequency-sharing, or a combination of them with time-sharing are also compatible with the present invention.

Radio communication networks requires usually that their radio transceivers fulfil criteria regarding transmitted power. Such constraints are set to avoid interference between different radio transceivers and to optimize the load on the radio interface. For this purpose, a possible drift of the transmitted power at the radio transceiver has to be avoided. Non linearity of amplifiers are also impairments of the transmitter part and should be compensated to limit for example inter-modulation effects. Some modulation types, for example the modulation used in EDGE system (Enhanced Data rate for GSM Evolution) are more sensitive to non linearity in the transmitter part of the radio transceiver resulting in a quality degradation. As a consequence, a dynamic control of the transmitter part of a radio transceiver may be necessary to guaranty good performance in the whole radio communication network.

EP-0,655,179 describes a method for testing a transceiver of a time divisional radio communication system. This method consists in assigning at least two free time slots for use selected in such a manner that when the transmitter transmits on the first selected time slot, the receiver simultaneously receives the second selected time slot. A predefined test signal is supplied to the input of the transmitter using the first selected time slot. The signal is first adapted to the reception frequency of the receiver and received in the second selected time slot at the receiver. The transceiver compares the signal obtained at the output of the receiver with the test signal supplied to the transmitter.

A drawback of this method is the use of a predefined test signal which has to be sent in a time slot available as well at the transmitter as at the receiver.

A particular object of the present invention is to obviate the problem described above.

Another object of the present invention is to provide a method for quantifying the transmitter part impairments.

SUMMARY OF THE INVENTION

This object, and others that shall appear below, are achieved by a method for controlling the transmitter part of a radio transceiver, the transmitter part comprising an IQ modulator, the radio receiver further comprising a receiver part comprising an IQ demodulator, the radio transceiver being dedicated to transmit modulated information signal over an air interface, the method being characterized by comprising the steps of:

storing an IQ modulation vector obtained at IQ modulator and associated to a portion of the information signal;

looping the portion of information signal to the receiver part, the information signal having crossed a simulated radio interface between the transmitter part and the receiver part;

estimating an error vector by comparing the IQ modulation vector to an IQ demodulation vector obtained by demodulation of the portion of information signal at IQ demodulator; and modifying transmitter part parameters according to the error vector.

An advantage of the present invention is to use a portion of the transmitted information signal itself to detect and compensate impairments in the transmitter part of the radio transceiver. As a consequence, there is no more need for a predefined separate test signal.

Another advantage of this invention is that the transmitter part parameters can be easily controlled by adding the latest error vector to IQ modulation vectors associated to subsequent portions of the information signal.

The present invention also concerns a radio transceiver implementing the above described method. The radio transceiver comprises a transmitter part with an IQ modulator, and a receiver part with a IQ demodulator, the radio transceiver being dedicated to transmit an information signal modulated by said IQ modulator through an air interface, the radio receiver being characterized in that it further comprises:

a derivation to loop a portion of an information signal dedicated to be transmitted over the air interface from the transmitter part to the receiver part over a simulated radio interface;

an error vector estimator comparing an IQ modulation vector associated to said portion of information signal to an IQ demodulation vector obtained by demodulation of said looped portion of information signal at the IQ demodulator; and a transmitter controller modifying parameters of the transmitter according to the error vector.

This invention is based on a priority application EP 00 44 01 32 which is hereby incorporated by reference.

BRIEF DESCRIPTION OF THE DRAWINGS

Other characteristics and advantages of the invention will appear on reading the following description of a preferred implementation given by way of non-limiting illustrations, and from the accompanying drawings, in which.

DETAILED DESCRIPTION OF THE INVENTION

Figure 1A:
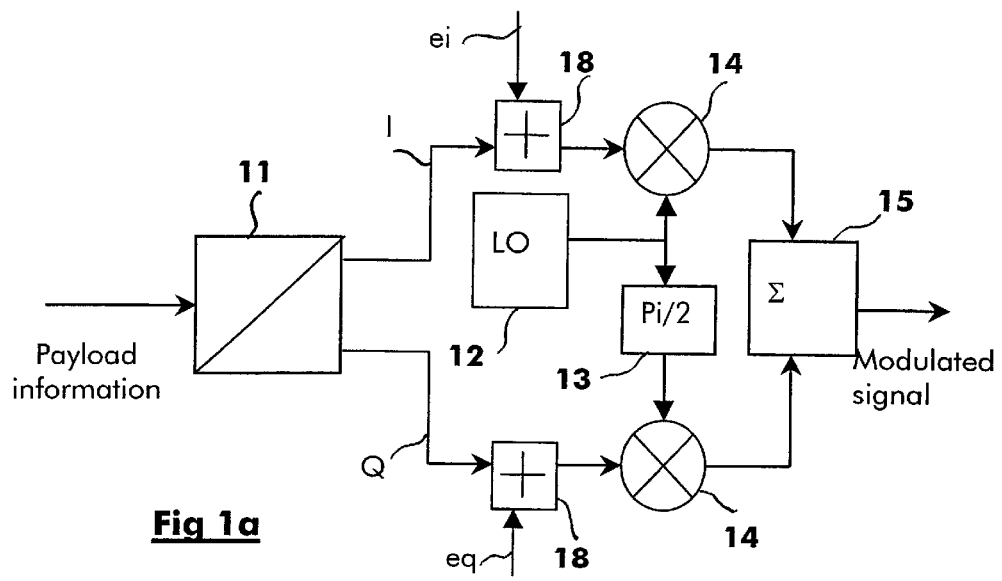
FIG. 1 illustrates the principles of an IQ modulator (FIG. 1a) and of an IQ demodulator (FIG. 1b)

A radio transceiver according to the invention comprises an IQ modulator and IQ demodulator to modulate/demodulate the information signal according to a predefined modulation scheme. The principles of an IQ modulator, respectively of an IQ demodulator, are showed on FIG. 1a, respectively FIG. 1b.

An IQ modulator comprises a serial/parallel converter 11, a local oscillator 12, a phase shifter 13, modulators 14, an adder 15 and compensation means 18. The payload information to be modulated is submitted to serial/parallel converter 11 in form of a bit sequence. Serial/parallel converter 11 separates the incoming bit sequence in two parallel bit sequences, the first being connected to the I path (in-phase) and the second to the Q path (in-quadrature) of IQ modulator. The bit sequence on each path is considered as a succession of n-tuplets. On path I, a first real value depending on the modulation constellation is associated to each n-tuplet, on path Q a second real value also depending on the modulation constellation is associated to each n-tuplet. The first and the second real value constitute the coordinates of the IQ modulation vector for the considered n-tuplet. The signal to be modulated is represented by a succession of IQ modulation vectors.

According to the present invention, the IQ modulator comprises compensation means 18 dedicated to add a vector (ei,eq) to IQ modulation vectors. The first, respectively the second, coordinate of the predefined vector is added to the first, respectively the second, coordinate of the IQ modulation vector. The vector (ei,eq) is preferably an error vector. The generation of this error vector will be detailed in the following.

Local oscillator 12 generates a high frequency carrier to be separately modulated on path I and Q at modulators 14. On path Q, phase shifter 15 between local oscillator 12 and modulator 14 is used to change the phase of the high frequency carrier so that the frequency carriers on path I and Q are phase shifted by 90°. Modulators 14 perform usual phase modulation (e.g. phase shift keying PSK) or phase combined with amplitude modulation (e.g. quadrature amplitude modulation QAM) and modulate the high frequency carriers on path I and Q with the payload information bit sequence. The output of modulators 14 on paths I and Q are added at adder 15 and constitute the modulated signal.

An IQ modulator/demodulator scheme can be used for example to realize Quadrature PSK or QAM modulations. For example, in case a Quadrature PSK modulation may be realized with an IQ modulator, modulators 14 being both Binary PSK modulators.

Symmetrically, an IQ demodulator comprises demodulators 16, local oscillator 12, phase shifter 13 and a parallel/serial converter 17. High frequency carriers, identical to the ones used at counterpart IQ modulator, are generated thanks to local oscillator 12 and to phase shifter 13. These high frequency carriers are used to demodulate the modulated signal at demodulators 16. The demodulated signal on path I and Q are represented by a IQ demodulator vector, converted in a bit sequence and submitted to parallel/serial converter 17 to reconstruct the payload information bit sequence.

Figure 1B:
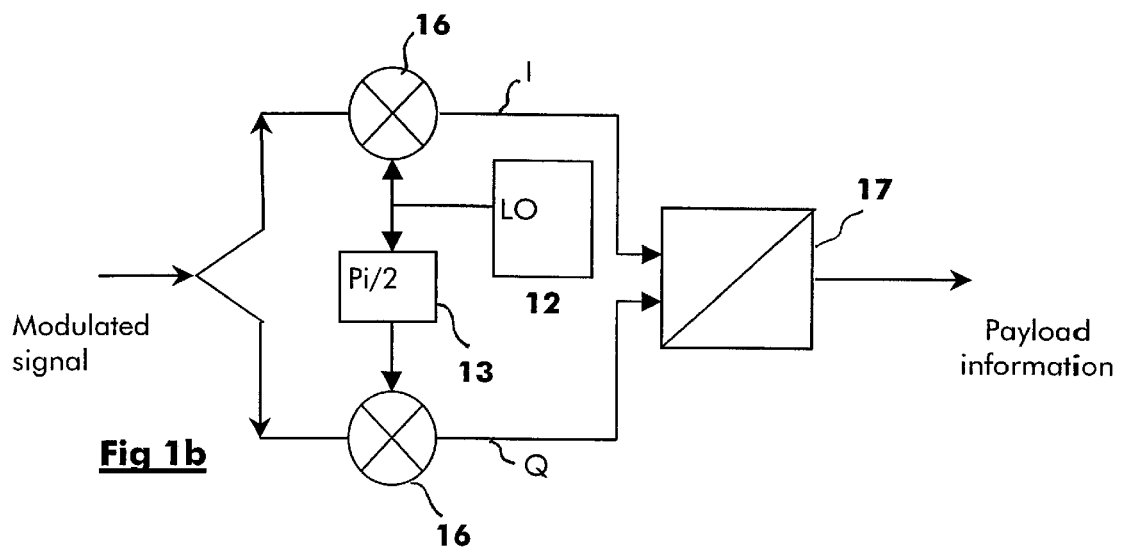
Figure 2:
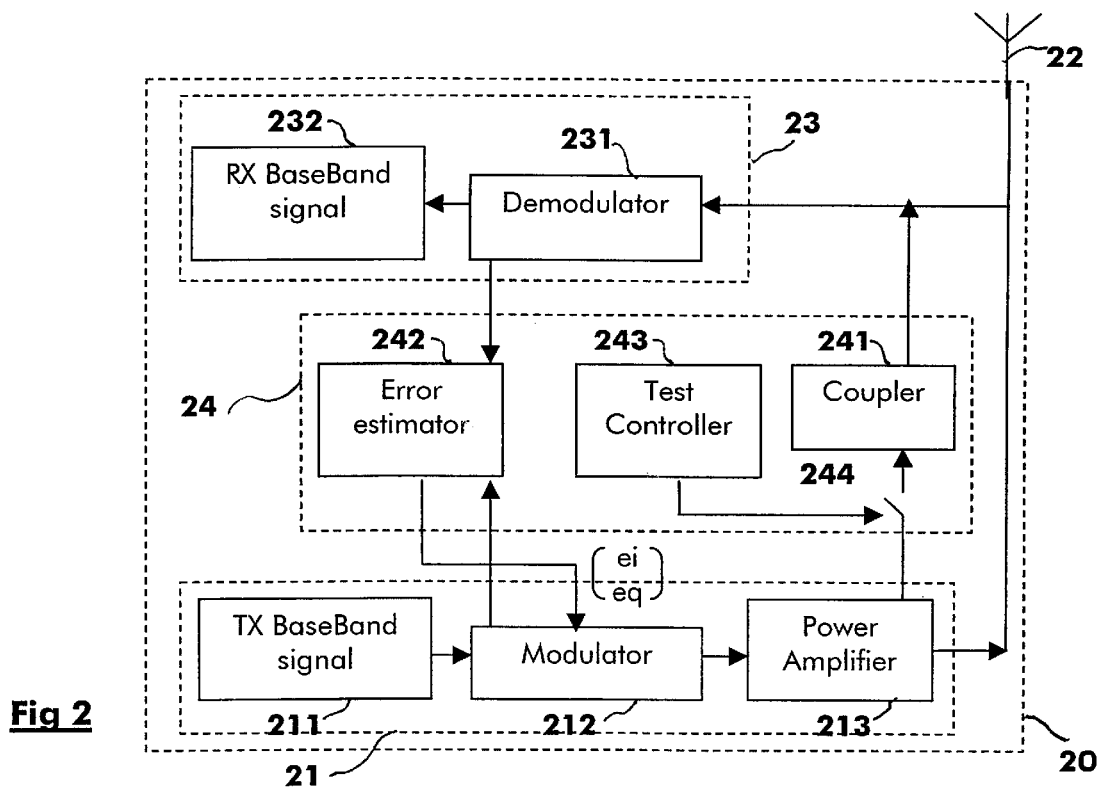
FIG. 2 shows an embodiment of a radio transceiver according to the present invention.

FIG. 2 illustrates an embodiment of a radio transceiver 20 according to the present invention comprising a transmitter part 21, an antenna 22, a receiver part 23 and a transmitter controller 24. Transmitted part 21 comprises a TX baseband signal module 211, an IQ modulator 212, preferably the IQ modulator represented on FIG. 1a and a power amplifier 213. Receiver part comprises a IQ demodulator 231, preferably the IQ demodulator represented on FIG. 1b and a RX baseband signal module 232. Transmitter controller 24 comprises a coupler 241, an error estimator 242, a test controller 243 and a switch 244. Error estimator 244 is connected to modulator 212.

Preferably, radio transceiver 20 comprises a unique local oscillator (not represented on FIG. 2) available for both IQ modulator 212 and IQ demodulator 231 and replacing the local oscillators 12 represented on FIG. 1a and FIG. 1b. A unique local oscillator avoids further phase drift between transmitter part 21 and receiver part 23.

TX baseband signal module 211 is connected to IQ modulator 212 and to power amplifier 213. Power amplifier 213 is connected to antenna 22 and to coupler 241 over switch 244. Coupler 241 as well as antenna 22 are connected to IQ demodulator 231 itself connected to RX baseband signal module 232. Modulator 212 as well as demodulator 231 are connected to error estimator 242.

TX baseband signal module 211 looks in a data buffer for data to be transmitted by radio transceiver 20. Preferably, if radio transceiver 20 is part of a time shared radio communication network, TX baseband signal module 211 also controls the use of time slots allocated to radio terminal 20. More generally, TX baseband signal module 211 is responsible for processing all communication protocols situated above physical layer in reference to the ISO/OSI model and generates a bit sequence to be modulated by IQ modulator 212 during the next time slot allocated for transmission to radio transceiver 20.

A modulated signal generated at the output of modulator 212 is amplified at power amplifier 213 and ready to be transmitted over antenna 22 in direction of the radio communication network, for example to a base station under the coverage of which radio terminal is situated.

During the modulation procedure, an IQ modulation vector associated to a portion of the bit sequence and used to generate the modulated signal is transmitted and stored at error detector 242. A portion of the amplified modulated information signal is derived from power amplifier 213 and submitted to coupler 241. In this first embodiment, switch 244 is continuously switched on.

Coupler 241 simulates a radio interface by having a low coupling factor attenuating the modulated signal crossing it. Preferably, coupler 241 generates no time delay between its input and its output so that the attenuated signal is simultaneously received at demodulator 231 of receiver part 23. Coupler 241 may be realized by means of printed lines on a Printed Control Board (PCB) supporting transmitter part 21 and receiver part 23.

Receiver part 23 is switched on during the time slot used by transmitter part 21 to transmit the modulated signal for which an IQ modulation vector has been transmitted to error estimator 242.

In case radio receiver 20 is part of a time shared radio communication network, receiver part 23 should not receive a modulated signal from the rest of the network (e.g. a corresponding base station) during the time slots in which it receives modulated information signal looped from transmitter part 21 so that this looped signal used for sake of test does not collide with the signal received from the rest of the network (e.g. from a corresponding base station). A TDD (Time Division Duplex) system fulfills for example this condition since a radio transceiver in such a system does not transmit and receive information from the network simultaneously.

For a system where time and code sharing are combined, the method described for time sharing can also be applied if the signal is generated by an IQ modulator.

The looped modulated information signal is then submitted to IQ demodulator 231 which generates an IQ demodulation vector in order to demodulate it. The demodulated signal is preferably not transmitted to RX baseband signal module 232 since the looped signal does not comprises payload information and is only used for sake of test. Demodulator 231 transmits the IQ demodulation vector associated to the looped information signal to error estimator 242.

Error estimator 242 compares IQ demodulation vector with the stored IQ modulation vector and calculates an error vector (ei,eq) resulting from the difference between the two vectors. In an ideal transmitter part, the two vectors should be identical. However, due to transmitter part non linearity as well as amplifier drift in the transmitter chain, the two vectors may be different. This error vector (ei,eq) is used to compensate the transmitter part impairments for the next transmitted signal. Preferably, the error vector (ei,eq) is submitted to compensation means 18 as represented on FIG. 1 a and added to the IQ modulation vectors generated at modulator 212.

In an other embodiment, error estimator 242 influences also the amplification factor of power amplifier 213. A predefined function links an error value with an amplification factor.

In a preferred embodiment, the derivation of modulated signal to test and compensate the transmitter impairments should be controlled by test controller 243 dedicated to switch on and off switch 244. Indeed, this test need not to be done for each transmit time slot. Test controller 243 selects the time slots for which the test has to performed and as a consequence a portion of the signal has to be derived and looped to the receiver part 23. A predefined time interval may be supervised at test controller 243 so that the test is performed only each X transmit time slots. The test controller should also be responsible for activating receive part 23 during the time slots for which the test has to be performed.

In another embodiment, the test controller 243 may be informed on the error value by error estimator 242 so that the time interval between two tests is made dependent of the current reported error vector. This embodiment would have the advantage to save transmit power at radio transceiver 20 and limit the tests to periods where impairments of the radio transceiver are critical.

Figure 3:
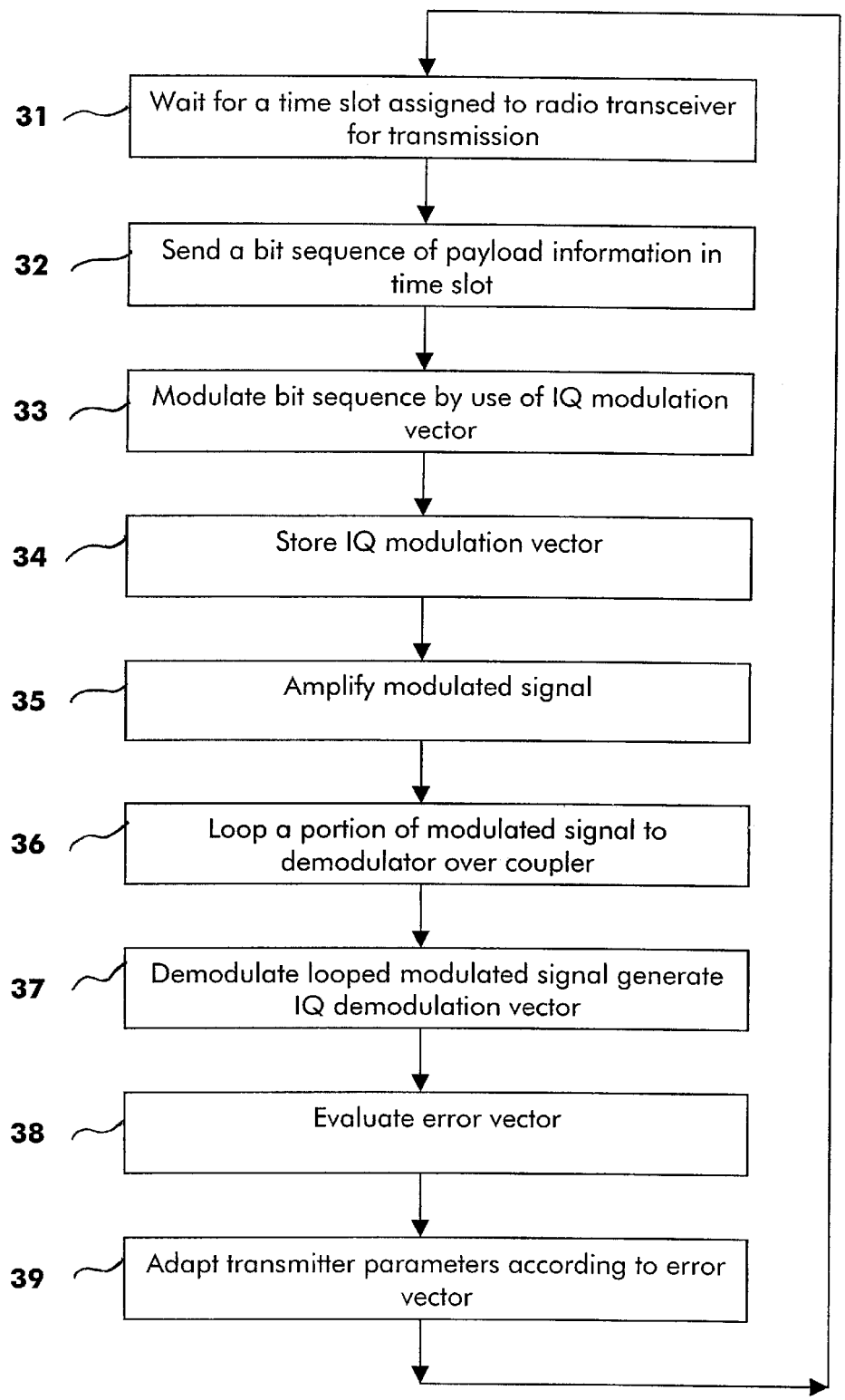
FIG. 3 shows a flow diagram giving a possible implementation of the method according to the invention.

FIG. 3 shows a flow diagram giving a possible implementation of the method according to the invention.

Step 31: consists in waiting for a time slot assigned to radio transceiver 20 for transmission in case radio transceiver 20 is part of a time divisional radio communication network;

Step 32: consists in preparing payload information to be sent in the assigned time slot;

Step 33: consists in modulating the payload information at an IQ modulator, an IQ modulation vector is associated to the payload information to be modulated and represent univocally the sequence of information bits to be modulated;

Step 34: consists in storing the IQ modulation vector associated to a portion of the information signal for further processing;

Step 35: consists in amplifying the modulated signal for sending it with a sufficient predefined power over the antenna on the air interface;

Step 36: consists in looping the portion of the amplified signal to the receiver part of the radio terminal this looped modulated signal crossing a coupler deemed to simulate a radio interface;

Step 37 consists in activating the receiver part on reception of the looped modulated signal to demodulate this signal. Preferably, no time delay is introduced by the coupler so that the receiver part is activated during the time slot assigned to the radio transceiver for transmission. The demodulation process comprises the step of generating an IQ demodulation vector;

Step 38 consists in forwarding the IQ demodulation vector to the error estimation module in order to compare the values of the IQ modulation vector and of the IQ demodulation vector and estimate an error vector corresponding to the difference between the two modulation and demodulation vectors.

Step 39 consists in fine tuning the parameters of the transmitter part e.g. the power amplification factor in order to minimize the error vector. A predefined function determine the value of the transmitter part parameters according to the error vector. The method consists in jumping to step 31 in waiting for the next time slot assigned for transmission to repeat the steps of the present method.

As already discussed above, the steps of the method may not be executed for each time slot assigned for transmission in order not to increase too much the power consumption required for controlling the transmitter part. Preferably, the time interval between two tests is also made dependent of a value related to the latest calculated error vector or the time interval between two tests is a constant fixed for the radio transceiver or a system parameter of the radio communication network.

What is claimed is:

1. A method for controlling a transmitter part of a radio transceiver, said transmitter part comprising an IQ modulator, said radio transceiver further comprising a receiver part comprising an IQ demodulator, said radio transceiver being dedicated to transmit a modulated information signal over an air interface, said method comprising the steps of:

storing an IQ modulation vector obtained at said IQ modulator and associated to a portion of said modulated information signal;

looping said portion of said modulated information signal from said transmitter part to said receiver part, via a simulated radio interface;

estimating an error vector by comparing said IQ modulation vector to an IQ demodulation vector obtained by demodulation of said portion of said modulated information signal at said IQ demodulator; and modifying transmitter part parameters to correct non-linearity of said transmitter part and a power drift of said modulated information signal according to said error vector.

2. A method according to claim 1, wherein said step of modifying said transmitter part parameters comprises adding said estimated error vector to IQ modulation vectors associated to subsequent portions of an information signal modulated by said IQ modulator.

3. A method according to claim 1, wherein said radio transceiver is part of a time divisional radio communication network where said transmitter part transmit said modulated information signal to the network during transmit time slots and said receive part receives an information signal from said network during receive time slots different from said transmit time slots, said receiver part receiving said portion of said modulated information signal during said transmit time slot in which said portion of said modulated signal information has been transmitted.

4. A method according to claim 1, wherein said simulated radio interface comprises coupler having a low coupling factor and generating no time delay for said portion of said modulated information signal looped from said transmitter part to said receiver part.

5. method according to claim 1, wherein said portion of said modulated information signal is looped from said transmitter part to said receiver part during transmit time slots separated by predefined time intervals.

6. A method according to claim 5, wherein a duration of said time intervals depends on a value related to said error vector.

7. A radio transceiver comprising:

a transmitter part comprising an IQ modulator for modulating an information signal, said transmitter part transmitting a modulated information signal generated by said IQ modulator through an air interface;

a receiver part comprising a IQ demodulator;

a coupler for looping a portion of said modulated information signal from said transmitter part to said receiver part over a simulated radio interface;

an error vector estimator comparing an IQ modulation vector associated to said portion of said modulated information signal to an IQ demodulation vector obtained by demodulation of said portion of said modulated information signal at said IQ demodulator; and a transmitter controller modifying parameters of said transmitter to correct non-linearity of said transmitter part and a power drift of said modulated information signal according to said error vector.

8. A radio transceiver according to claim 7, characterized in that said IQ modulator comprises compensation means to add said error vector to IQ modulation vectors associated to subsequent portions of said information signal.

9. A radio transceiver according to claim 7, further comprising a test controller to enable or disable the looping of portion of said modulated information signal over said simulated radio interface.

* * * * *